(12) United States Patent
Raghavan

(10) Patent No.: US 12,500,647 B2
(45) Date of Patent: Dec. 16, 2025

(54) BEAM QUAD SELECTION FOR FOUR-LAYER MILLIMETER WAVE TRANSMISSIONS

(71) Applicant: QUALCOMM Incorporated, San Diego, CA (US)

(72) Inventor: Vasanthan Raghavan, West Windsor Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 517 days.

(21) Appl. No.: 18/051,754

(22) Filed: Nov. 1, 2022

(65) Prior Publication Data

US 2024/0146380 A1 May 2, 2024

(51) Int. Cl.
| | |
|---|---|
| H04B 7/06 | (2006.01) |
| H04B 7/0408 | (2017.01) |
| H04B 7/0456 | (2017.01) |
| H04B 7/10 | (2017.01) |
| H04L 5/00 | (2006.01) |
| H04L 25/02 | (2006.01) |

(52) U.S. Cl.
CPC ......... *H04B 7/0695* (2013.01); *H04B 7/0408* (2013.01); *H04B 7/0456* (2013.01); *H04B 7/0617* (2013.01); *H04B 7/10* (2013.01); *H04L 5/0048* (2013.01); *H04L 25/021* (2013.01)

(58) Field of Classification Search
None
See application file for complete search history.

(56) References Cited

U.S. PATENT DOCUMENTS

| | | |
|---|---|---|
| 2012/0027111 A1 | 2/2012 | Vook et al. |
| 2017/0244533 A1* | 8/2017 | Onggosanusi ....... H04B 7/0478 |
| 2020/0358505 A1 | 11/2020 | Park et al. |
| 2021/0226674 A1 | 7/2021 | Ramireddy et al. |

(Continued)

OTHER PUBLICATIONS

Ericsson: "Discussions on AI-CSI", 3GPP TSG-RAN WG1 Meeting #110-bis-e, R1-2208728, 3rd Generation Partnership Project, Mobile Competence Centre, 650, Route Des Lucioles, F-06921 Sophia-Antipolis Cedex, France, vol. RAN WG1, No. Online, Oct. 10, 2022-Oct. 19, 2022, Sep. 30, 2022, XP052276651, pp. 1-17, pp. 5, 6, Figures 2, 3.

(Continued)

*Primary Examiner* — Minh Trang T Nguyen
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network node, one or more downlink reference signals during a beam training procedure. The UE may estimate, based at least in part on one or more metrics associated with the one or more downlink reference signals received during the beam training procedure, a covariance matrix associated with multiple candidate beam quads used to transmit or receive the one or more downlink reference signals. The UE may select, from among the multiple candidate beam quads, a beam quad that corresponds to a group of four beams to optimize one or more parameters associated with the covariance matrix. The UE may communicate with the network node using the selected beam quad. Numerous other aspects are described.

30 Claims, 10 Drawing Sheets

(56) References Cited

U.S. PATENT DOCUMENTS

2022/0149908 A1\* 5/2022 Gao .................... H04B 7/0634
2022/0247455 A1 8/2022 Raghavan et al.

OTHER PUBLICATIONS

International Search Report and Written Opinion—PCT/US2023/075831—ISA/EPO—Apr. 9, 2024.
Partial International Search Report—PCT/US2023/075831—ISA/EPO—Feb. 5, 2024.

\* cited by examiner

BEAM QUAD SELECTION FOR
FOUR-LAYER MILLIMETER WAVE
TRANSMISSIONS

FIELD OF THE DISCLOSURE

Aspects of the present disclosure generally relate to wireless communication and to techniques and apparatuses associated with beam quad selection for four-layer (4L) millimeter wave transmissions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, from a network node, one or more downlink reference signals during a beam training procedure. The method may include estimating, based at least in part on one or more metrics associated with the one or more downlink reference signals received during the beam training procedure, a covariance matrix associated with multiple candidate beam quads used to transmit or receive the one or more downlink reference signals. The method may include selecting, from among the multiple candidate beam quads, a beam quad that corresponds to a group of four beams to optimize one or more parameters associated with the covariance matrix. The method may include communicating with the network node using the selected beam quad.

Some aspects described herein relate to an apparatus for wireless communication. The apparatus may include a memory and one or more processors coupled to the memory. The one or more processors may be configured to receive, from a network node, one or more downlink reference signals during a beam training procedure. The one or more processors may be configured to estimate, based at least in part on one or more metrics associated with the one or more downlink reference signals received during the beam training procedure, a covariance matrix associated with multiple candidate beam quads used to transmit or receive the one or more downlink reference signals. The one or more processors may be configured to select, from among the multiple candidate beam quads, a beam quad that corresponds to a group of four beams to optimize one or more parameters associated with the covariance matrix. The one or more processors may be configured to communicate with the network node using the selected beam quad.

Some aspects described herein relate to a non-transitory computer-readable medium that stores a set of instructions for wireless communication by a UE. The set of instructions, when executed by one or more processors of the UE, may cause the UE to receive, from a network node, one or more downlink reference signals during a beam training procedure. The set of instructions, when executed by one or more processors of the UE, may cause the UE to estimate, based at least in part on one or more metrics associated with the one or more downlink reference signals received during the beam training procedure, a covariance matrix associated with multiple candidate beam quads used to transmit or receive the one or more downlink reference signals. The set of instructions, when executed by one or more processors of the UE, may cause the UE to select, from among the multiple candidate beam quads, a beam quad that corresponds to a group of four beams to optimize one or more parameters associated with the covariance matrix. The set of instructions, when executed by one or more processors of the UE, may cause the UE to communicate with the network node using the selected beam quad.

Some aspects described herein relate to an apparatus for wireless communication. The apparatus may include means for receiving, from a network node, one or more downlink reference signals during a beam training procedure. The apparatus may include means for estimating, based at least in part on one or more metrics associated with the one or more downlink reference signals received during the beam training procedure, a covariance matrix associated with multiple candidate beam quads used to transmit or receive the one or more downlink reference signals. The apparatus may include means for selecting, from among the multiple candidate beam quads, a beam quad that corresponds to a group of four beams to optimize one or more parameters associated with the covariance matrix. The apparatus may include means for communicating with the network node using the selected beam quad.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
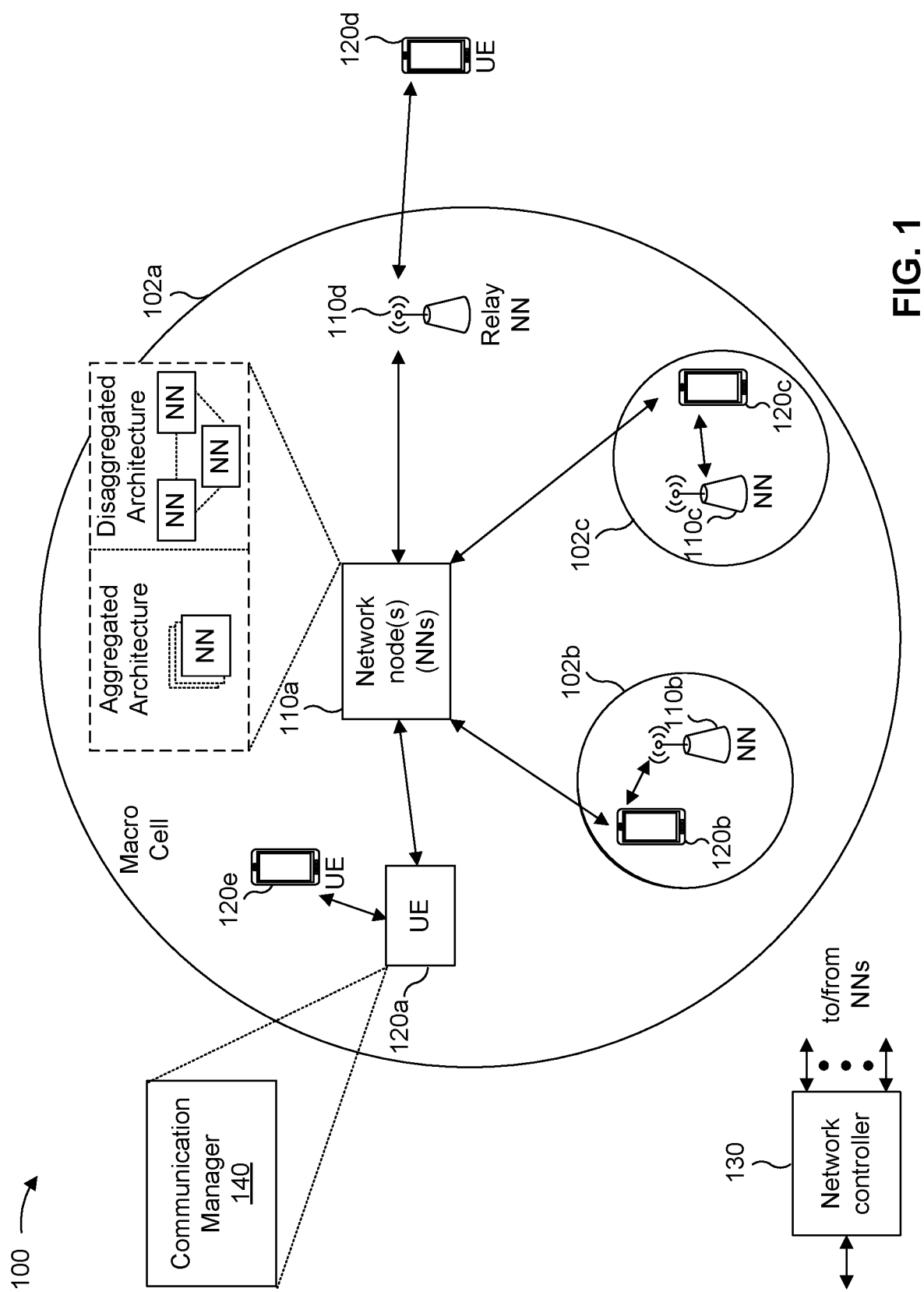
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a network node 110, one or more downlink reference signals during a beam training procedure; estimate, based at least in part on one or more metrics associated with the one or more downlink reference signals received during the beam training procedure, a covariance matrix associated with multiple candidate beam quads used to transmit or receive the one or more downlink reference signals; select, from among the multiple candidate beam quads, a beam quad that corresponds to a group of four beams to optimize one or more parameters associated with the covariance matrix; and communicate with the network node 110 using the selected beam quad. Additionally, or alternatively, the communication manager 140 may perform one or more other operations described herein.

As indicated above, FIG. 1 is provided as an example. Other examples may differ from what is described with regard to FIG. 1.

Figure 2:
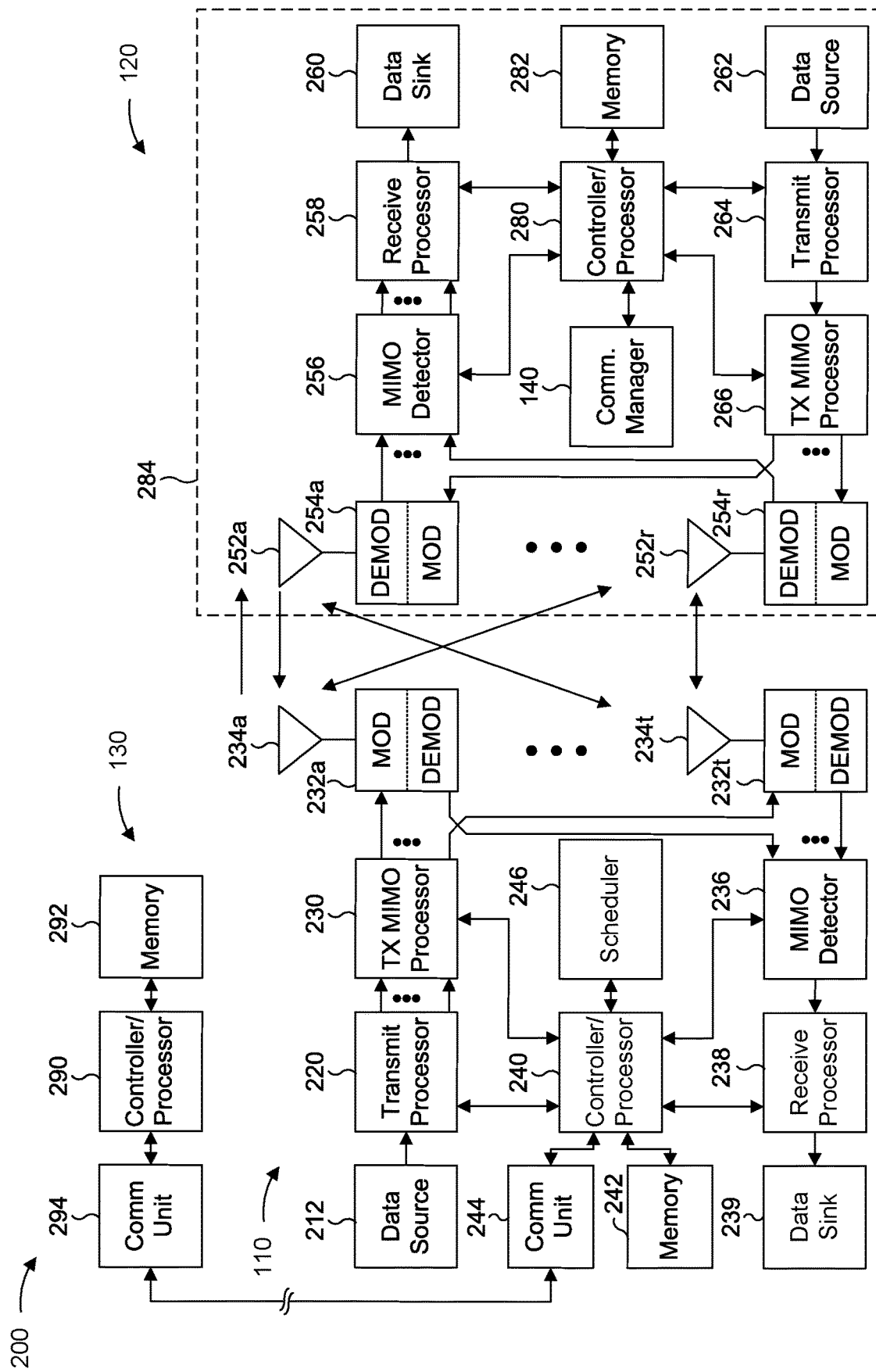
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIG. 5, FIGS. 6A-6C, FIG. 7, and/or FIG. 8).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIG. 5, FIGS. 6A-6C, FIG. 7, and/or FIG. 8).

The controller/processor 240 of the network node 110, the controller/processor 280 of the UE 120, and/or any other component(s) of FIG. 2 may perform one or more techniques associated with beam quad selection for 4L millimeter wave transmissions, as described in more detail elsewhere herein. For example, the controller/processor 240 of the network node 110, the controller/processor 280 of the UE 120, and/or any other component(s) of FIG. 2 may perform or direct operations of, for example, process 700 of FIG. 7 and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7 and/or other processes as described herein. In some examples, executing instructions may include running the instructions, converting the instructions, compiling the instructions, and/or interpreting the instructions, among other examples.

In some aspects, the UE 120 includes means for receiving, from a network node 110, one or more downlink reference signals during a beam training procedure; means for estimating, based at least in part on one or more metrics associated with the one or more downlink reference signals received during the beam training procedure, a covariance matrix associated with multiple candidate beam quads used to transmit or receive the one or more downlink reference signals; means for selecting, from among the multiple candidate beam quads, a beam quad that corresponds to a group of four beams to optimize one or more parameters associated with the covariance matrix; and/or means for communicating with the network node 110 using the selected beam quad. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, the DU, and the RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
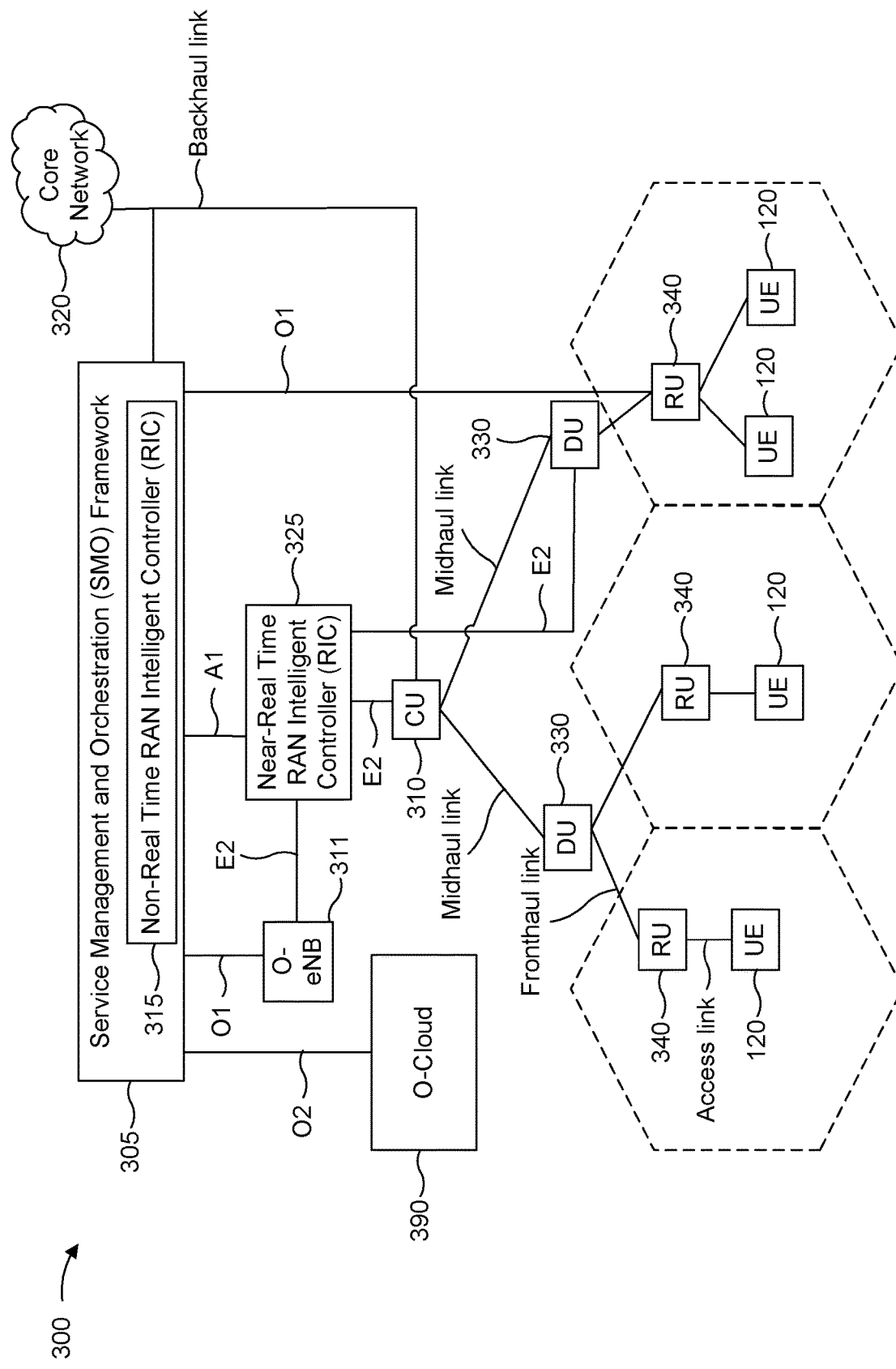
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT MC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
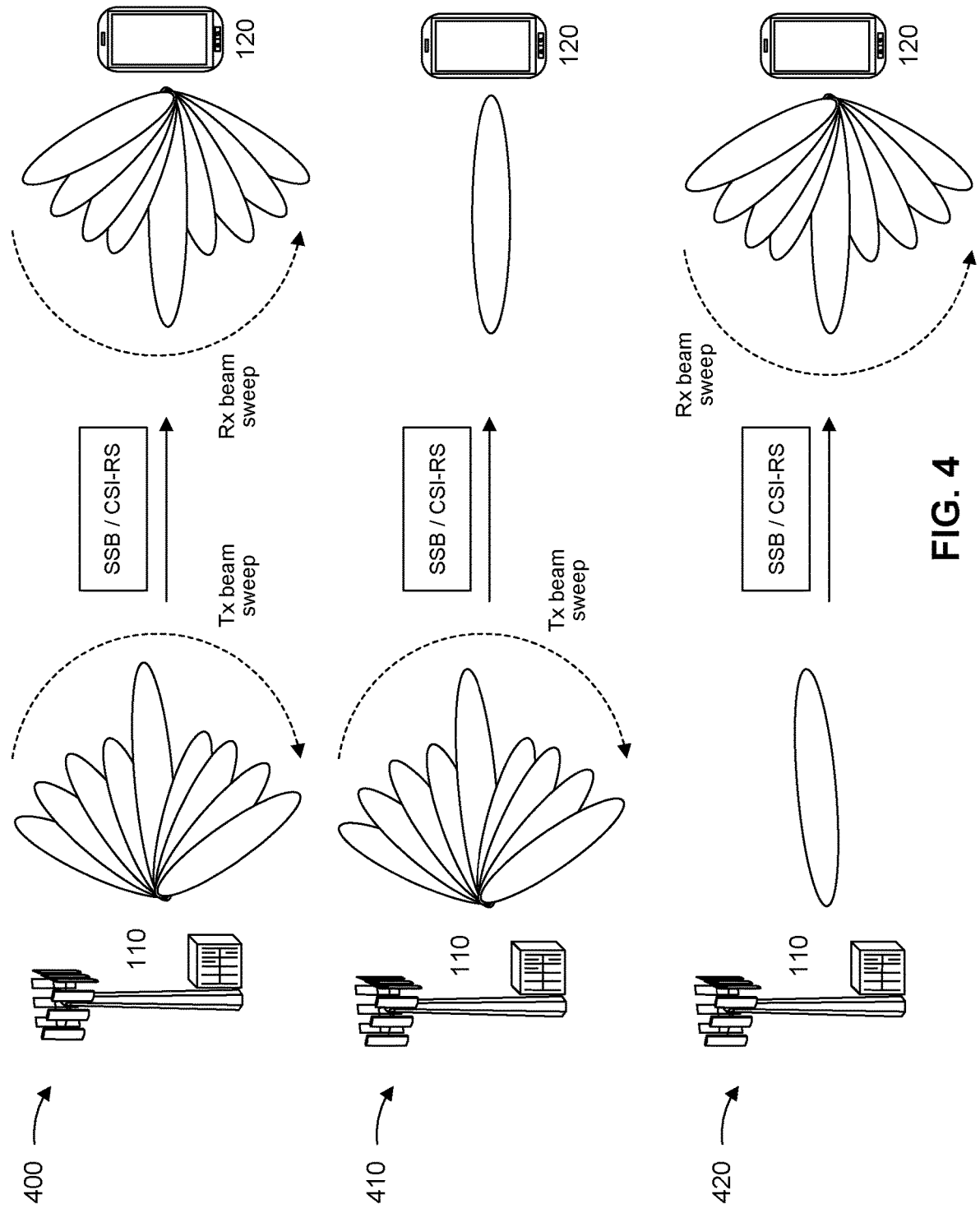
FIG. 4 is a diagram illustrating examples of beam management procedures, in accordance with the present disclosure.

FIG. 4 is a diagram illustrating examples 400, 410, and 420 of beam management procedures based on downlink reference signal transmissions, in accordance with the present disclosure. As shown in FIG. 4, examples 400, 410, and 420 include a UE 120 in communication with a network node 110 in a wireless network (e.g., wireless network 100). However, the devices shown in FIG. 4 are provided as examples, and the wireless network may support communication and beam management between other devices (e.g., between a UE 120 and a TRP, DU, or RU, between a mobile termination node and a control node, between an IAB child node and an IAB parent node, and/or between a scheduled node and a scheduling node). In some aspects, the UE 120 and the network node 110 may be in a connected state (e.g., an RRC connected state) when performing the beam management procedure(s).

As shown in FIG. 4, example 400 may include the network node 110 and the UE 120 communicating to perform beam management using synchronization signal block (SSB) transmissions or channel state information reference signal (CSI-RS) transmissions. Example 400 depicts a first beam management procedure (e.g., P1-based beam management). The first beam management procedure may be referred to as a beam selection procedure, an initial beam acquisition procedure, a beam sweeping procedure, a cell search procedure, and/or a beam search procedure. As shown in FIG. 4 and example 400, SSBs and/or CSI-RSs may be configured to be transmitted from the network node 110 to the UE 120 during the first beam management procedure. For example, an SSB transmitted by the network node 110 is a rank-1 periodic reference signal that is always transmitted by the network node 110 to enable initial network acquisition and synchronization in addition to beam selection and beam management. For example, an identifier associated with an SSB may have a one-to-one mapping to a transmit beam and/or spatial filter used by the network node 110, and the one-to-one mapping may be invariant (e.g., static) over time. Additionally, or alternatively, in cases where CSI-RS transmissions are used for the first beam management procedure, the CSI-RSs used for beam selection or beam management may be configured to be periodic (e.g., using RRC signaling), semi-persistent (e.g., using media access control (MAC) control element (MAC-CE) signaling), and/or aperiodic (e.g., using downlink control information (DCI)).

The first beam management procedure may include the network node 110 performing a beam sweep over multiple transmit (Tx) beams. The network node 110 may transmit an SSB or a CSI-RS using each transmit beam for beam management. To enable the UE 120 to perform receive (Rx) beam sweeping, the network node 110 may use a transmit beam to transmit (e.g., with repetitions) each SSB or CSI-RS at multiple times within the same reference signal resource set so that the UE 120 can perform a beam sweep over multiple receive beams in multiple transmission instances. For example, if the network node 110 has a set of N transmit beams and the UE 120 has a set of M receive beams, the SSB or CSI-RS may be transmitted on each of the N transmit beams M times such that the UE 120 may receive M instances of the SSB or CSI-RS per transmit beam. In other words, for each transmit beam of the network node 110, the UE 120 may perform a beam sweep through the receive beams of the UE 120. As a result, the first beam management procedure may enable the UE 120 to measure an SSB or CSI-RS on different transmit beams using different receive beams to support selection of one or more transmit/receive beam pair(s) (e.g., a pairing between a transmit beam of the network node 110 and a receive beam of the UE 120). The UE 120 may report the measurements to the network node 110 to enable the network node 110 to select one or more beam pairs for communication between the network node 110 and the UE 120.

As shown in FIG. 4, example 410 may include the network node 110 and the UE 120 communicating to perform beam management using SSB transmissions or CSI-RS transmissions. Example 410 depicts a second beam management procedure (e.g., P2-based beam management). The second beam management procedure may be referred to as a beam refinement procedure, a base station-side beam refinement procedure, a network node beam refinement procedure, and/or a transmit beam refinement procedure (for downlink operations), among other examples. As shown in FIG. 4 and example 410, SSBs and/or CSI-RSs may be configured to be transmitted from the network node 110 to the UE 120. The SSBs may be periodic, and the CSI-RSs may be configured to be aperiodic (e.g., using DCI). The second beam management procedure may include the network node 110 performing a beam sweep over one or more transmit beams. The one or more transmit beams may be a subset of all transmit beams associated with the network node 110 (e.g., determined based at least in part on measurements reported by the UE 120 in connection with the first beam management procedure). The network node 110 may transmit an SSB or a CSI-RS using each transmit beam of the one or more transmit beams for beam management. The UE 120 may measure each SSB or CSI-RS using a single (e.g., a same) receive beam (e.g., determined based at least in part on measurements performed in connection with the first beam management procedure). The second beam management procedure may enable the network node 110 to select a best transmit beam based at least in part on measurements of the SSBs and/or CSI-RSs (e.g., measured by the UE 120 using the single receive beam) reported by the UE 120.

As shown in FIG. 4, example 420 depicts a third beam management procedure (e.g., P3-based beam management). The third beam management procedure may be referred to as a beam refinement procedure, a UE-side beam refinement procedure, a receive beam refinement procedure, and/or a UE beam management procedure, among other examples. As shown in FIG. 4 and example 420, one or more SSBs or CSI-RSs may be configured to be transmitted from the network node 110 to the UE 120. The SSBs may be configured to be periodic, and the CSI-RSs may be configured to be aperiodic (e.g., using DCI). The third beam management process may include the network node 110 transmitting the one or more SSBs or CSI-RSs using a single transmit beam (e.g., determined based at least in part on measurements reported by the UE 120 in connection with the first beam management procedure and/or the second beam management procedure). To enable the UE 120 to perform receive beam sweeping, the network node 110 may use a transmit beam to transmit (e.g., with repetitions) an SSB or CSI-RS at multiple times within the same reference signal resource set such that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the UE 120 to select a best receive beam based at least in part on measurements of the SSBs or CSI-RSs and/or may enable the network node 110 to select a best receive beam for the UE 120 based at least in part on reported measurements received from the UE 120 (e.g., measurements of the SSB and/or CSI-RS using the one or more receive beams).

In some cases, the UE 120 and the network node 110 may use beamforming to improve performance associated with downlink and/or uplink communication over a millimeter wave (mmW) channel. For example, a mmW channel (e.g., in FR2, FR4, FR5 or even FR3) may suffer from high propagation loss because mmW signals have a higher frequency and a shorter wavelength than various other radio waves used for communications (e.g., sub-6 GHz communications in FR1). As a result, mmW signals often have shorter propagation distances, may be subject to atmospheric attenuation, and/or may be more easily blocked and/or subject to penetration loss through objects or other obstructions, among other examples. For example, a mmW signal may be reflected by lamp posts, vehicles, glass/window panes, and/or metallic objects, may be diffracted by edges or corners of buildings and/or walls, and/or may be scattered via irregular objects such as walls and/or human bodies (e.g., a hand blocking an antenna module when a device is operated in a gaming mode). Accordingly, beamforming may be used at both the UE 120 and the network node 110 to counter the propagation loss in a mmW channel and thereby improve performance for mmW communication. For example, to achieve a beamforming gain on a downlink, the network node 110 may generate a downlink transmit beam that is steered in a particular direction and the UE 120 may generate a corresponding downlink receive beam. Similarly, to achieve a beamforming gain on an uplink, the UE 120 may generate an uplink transmit beam that is steered in a particular direction, and the network node 110 may generate a corresponding uplink receive beam. In some cases, the UE 120 may be permitted to select the downlink receive beam to optimize reception of a downlink transmission from the network node 110 and/or may be permitted to select the uplink transmit beam to optimize reception at the network node 110 for an uplink transmission by the UE 120.

As indicated above, FIG. 4 is provided as an example. Other examples may differ from what is described with regard to FIG. 4.

Figure 5:
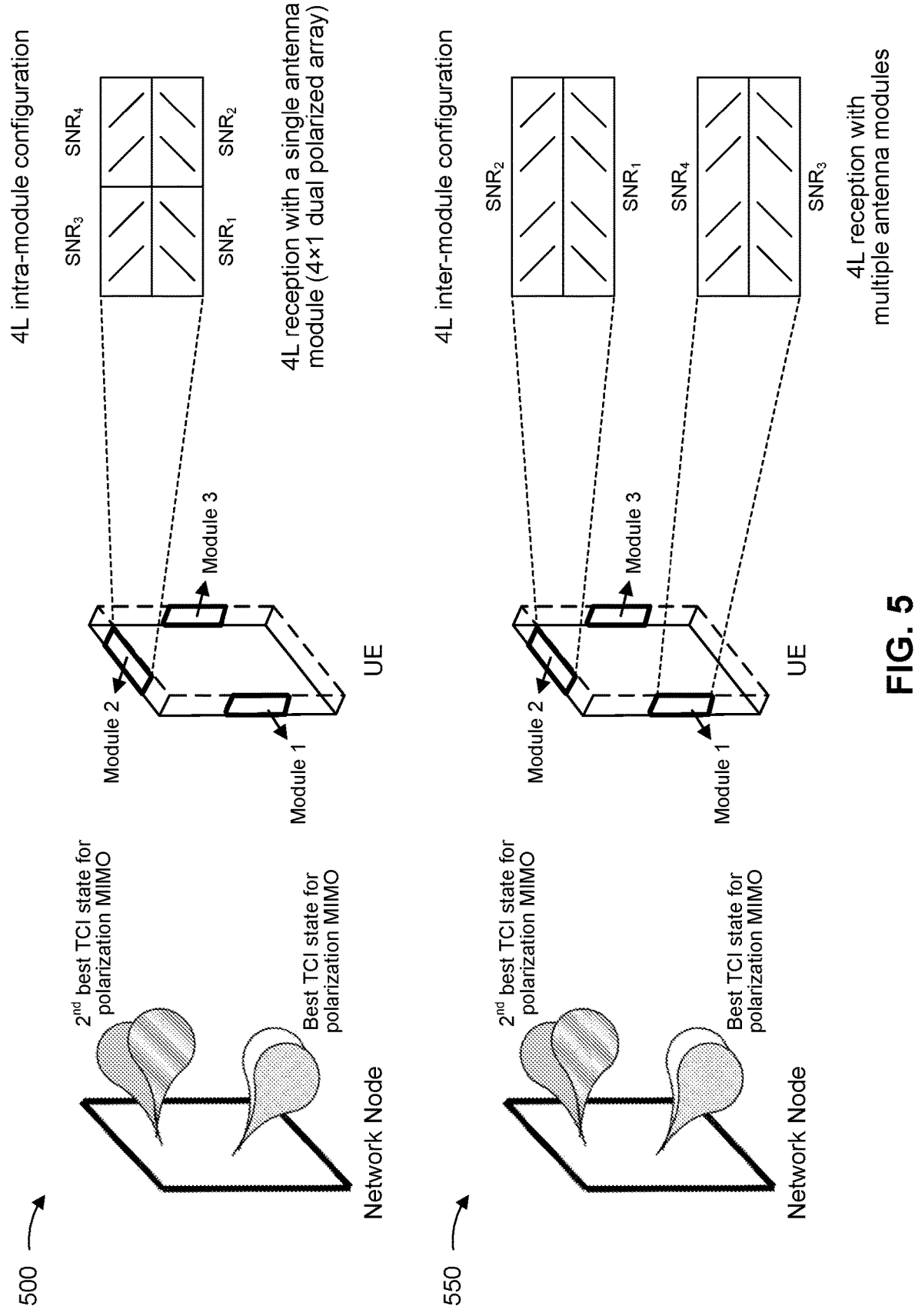
FIG. 5 is a diagram illustrating examples associated with four-layer (4L) millimeter wave transmissions, in accordance with the present disclosure.

FIG. 5 is a diagram illustrating examples 500, 500 associated with four-layer (4L) MIMO communication, in accordance with the present disclosure. As shown in FIG. 5, examples 500, 550 include communication between a network node (e.g., network node 110) and a UE (e.g., UE 120). In some aspects, the network node and the UE may communicate in a wireless network, such as wireless network 100. The network node and the UE may communicate via a wireless access link, which may include an uplink and a downlink.

As described herein, the UE and the network node may use beamforming to improve performance associated with downlink and/or uplink communication over a mmW channel. For example, a mmW channel (e.g., in FR2 or FR4) may suffer from high propagation loss because mmW signals have a higher frequency and a shorter wavelength than various other radio waves used for communications (e.g., sub-6 GHz communications in FR1). As a result, mmW signals often have shorter propagation distances, may be subject to atmospheric attenuation, and/or may be more easily blocked and/or subject to penetration loss through objects or other obstructions, among other examples. For example, a mmW signal may be reflected by lamp posts, vehicles, glass/windowpanes, and/or metallic objects, may be diffracted by edges or corners of buildings and/or walls, and/or may be scattered via irregular objects such as walls and/or human bodies (e.g., a hand blocking an antenna module when a device is operated in a gaming mode). Accordingly, beamforming may be used at both the UE and the network node to counter the propagation loss in a mmW channel and thereby improve performance for mmW communication. For example, to achieve a beamforming gain on a downlink, the network node may generate a downlink transmit beam that is steered in a particular direction and the UE may generate a corresponding downlink receive beam. Similarly, to achieve a beamforming gain on an uplink, the UE may generate an uplink transmit beam that is steered in a particular direction, and the network node may generate a corresponding uplink receive beam.

In this way, beamforming from multiple antennas may provide gains to bridge a link budget over a mmW channel. For example, multiple antenna modules and/or antenna panels may each have a set of antenna elements that can be co-phased to enable beamforming over a mmW channel. Accordingly, using multiple antenna modules and/or antenna panels to enable beamforming may provide capabilities to satisfy spherical coverage requirements with or without blockage (e.g., by a user's hand or body, or by an obstacle in a surrounding environment) regardless of a direction in which a signal is propagating. Furthermore, using multiple antenna modules and/or antenna panels may provide robustness against changes in wireless propagation patterns by enabling beam switching over the multiple antenna modules and/or antenna panels.

For example, referring to FIG. 5, examples 500, 550 depict a UE with an antenna module design that is often used to enable beamforming in a premium or high-tier UE category. For example, as shown in FIG. 5, the antenna module design includes multiple antenna modules, each of which includes one or more antenna arrays that may be designed to cover an operating bandwidth associated with a frequency range (e.g., from 24-48 GHz in FR2 and/or 57-71 GHz in FR4, among other examples). For example, in FIG. 5, the UE has three antenna modules (shown as Module 1 through Module 3) on three edges of the UE (e.g., two long edges and one short or top edge), that each include an antenna array (e.g., a 4×1 or 5×1 dual-polarized antenna array) to support wireless communication in an operating bandwidth. For example, the UE may include different antenna modules and related hardware (e.g., RF integrated circuits (RFICs)) to cover different frequency ranges (e.g., FR1 between 410 MHz and 7.125 GHz, FR2 between 24.25 GHz and 52.6 GHz, FR3 between 7.125 GHz and 24.25 GHz, FR4 between 52.6 GHz and 114.25 GHz, and/or FR5 including frequencies higher than 114.25 GHz, among other examples). Additionally, or alternatively, one or more antenna modules may include an interleaved antenna array in which some antenna elements cover a first bandwidth part and some antenna elements cover a second bandwidth part. For example, in an interleaved antenna array that covers an operating bandwidth within FR2 (e.g., an operating bandwidth from 24-48 GHz), one or more antenna elements may cover a bandwidth part from 28-39 GHz and one or more antenna elements may cover a bandwidth part from 39-48 GHz.

When a UE and a network node communicate using beamforming over a mmW channel, the UE and the network node may generally communicate using two-port or two-layer (2L) transmissions where each port is used for communicating an independent spatial and/or polarization layer of data. In particular, the two ports or layers used in 2L transmissions at mmW frequencies typically correspond to a polarization MIMO configuration in which the network node transmits over two polarizations (e.g., horizontal and vertical polarizations, slant ±45, or any other mixed polarization type), and the UE receives the 2L transmissions using a dual-polarized array (e.g., polarization 0 and polarization 1, which may correspond to horizontal and vertical polarizations or other suitable mixed polarizations). For example, the UE may be equipped with a dual polarized set of antenna elements that are orthogonal to each other in a polarization space, and the UE and the network node can communicate and separate out the two layers by performing polarization-based transmissions. For example, when transmitting a signal, the transmitted signal may be pointed in the same or similar beam direction(s) using the two polarizations, which separates the two layers in a polarization domain, a code domain, and/or another suitable domain. However, as mmW communication systems continue to advance, there are emerging trends driving 4L MIMO transmissions. In such systems, polarization-based transmissions alone is not sufficient.

For example, in 2L MIMO transmissions, a UE and a network node generally select a best beam pair to maximize an RSRP or other signal strength metric over one or more SSB transmissions. However, selecting the best beam pair to maximize a signal strength metric over one or more SSB transmissions is suboptimal from a rate perspective, because SSBs are rank-1 signals and mix polarizations at both ends of the link. Accordingly, SSBs are unable to accurately capture mutual information associated with 2L transmissions. Alternatively, in some cases, the UE and the network node may select the best beam pair to maximize spectral efficiency using two-port CSI-RS signals. However, in some cases, there may be various use-cases that have very high data rate demands, which may be better served using 4L MIMO transmissions that allow the UE to transmit or receive four layers at the same time (e.g., when the UE needs to download a large number of simultaneous packets). Although 4L MIMO transmissions may offer very high data rates, 4L MIMO poses various challenges, including that the additional layers consume more power, whereby increasing the number of layers increases power consumption and/or thermal overhead (heat) that needs to be dissipated. The power consumption and heat dissipation issues can in turn lead to significant bottlenecks in terms of system performance. Nonetheless, despite the power consumption and thermal issues potentially limiting 4L MIMO to certain use-cases, there is a need to provide active support from a signaling perspective and from an algorithmic perspective in terms of testing 4L designs to verify compliance with power and/or thermal constraints.

However, configuring 4L MIMO is more complicated than 2L MIMO transmissions because 2L MIMO typically use polarization MIMO transmissions, where a single beam points in a certain direction and the network node and the UE perform beam training in which the network node and the UE sweeps through different beams to select the beam pair that best maximizes the received signal quality, typically measured as an RSRP or an RSRQ parameter. Accordingly, the selected beam at the UE may be paired with a corresponding transmission configuration indication (TCI) state or beam at the network node, which may be used to establish a two-layer link based on that particular beam, which coincides for both polarizations at the network node and the UE or is mapped from one polarization to another polarization in a deterministic manner. To extrapolate the same or a similar beam selection approach to 4L MIMO, generalizing the beam selection approach to four layers becomes extremely difficult. Accordingly, some aspects described herein relate to techniques to select beam quads, or groups of four beams, that are used for 4L transmissions. For example, some aspects described herein relate to techniques that may be used to select four beams at the network node and four corresponding beams at the UE, where the four beams (or beam quad) may be dual-polarized such that there are two beams per spatial direction (e.g., horizontal and vertical polarizations or slant ±45 polarizations per spatial direction). As an extrapolation to eight-layer (8L) MIMO, there would be four beam directions corresponding to four beams at the network node, which scales by the number of polarizations per beam direction (typically two polarizations per beam direction). In other words, because mmW transmissions are performed using polarization MIMO, the number of layers is generally twice the number of beam directions. A similar extrapolation to sixteen-layer (16L) MIMO is also easily describable.

For example, referring to FIG. 5, example 500 depicts a 4L intra-module configuration and example 550 depicts a 4L inter-module configuration, where the network node in examples 500 and 550 communicates using a beam quad that corresponds to a first beam pair associated with a best TCI state for polarization MIMO and a second beam pair associated with a second best TCI state for polarization MIMO. In general, the two beams in each beam pair are both pointing in the same direction, but have different polarizations (shown using different fill patterns in FIG. 5). Furthermore, although the examples 500, 550 depicted in FIG. 5 include two beam pairs that are associated with two TCI states, it will be appreciated that a single TCI state or multiple TCI states may be used at the network node. In example 500, there is a single panel at the network node, where the single panel steers a first set of two layers in polarization MIMO in a first direction and a second set of two layers in polarization MIMO in a second direction, and the UE can receive the four layers using a single antenna module (e.g., a 4×1 or 5×1 dual polarized array). For example, in example 500, the slanted lines each correspond to a set of antenna elements that has a particular polarization, while a cross (not used in FIG. 5) would represent the orthogonal polarization of a dual-polarized antenna element.

Accordingly, in example 500, the UE includes a 4×1 dual polarized array that is divided into a first set of antenna elements associated with a first polarization, which is used to receive a first layer (e.g., associated with $SNR_3$ in FIG. 5), a second set of antenna elements associated with the first polarization, which is used to receive a second layer (e.g., associated with $SNR_4$ in FIG. 5), a third set of antenna elements associated with a second polarization, which is used to receive a third layer (e.g., associated with $SNR_1$ in FIG. 5), and a fourth set of antenna elements associated with the second polarization, which is used to receive a fourth layer (e.g., associated with $SNR_2$ in FIG. 5). In contrast, example 550 depicts inter-module 4L MIMO, which uses multiple antenna modules equipped at the UE. For example, in the inter-module 4L MIMO configuration, a first antenna module includes a first set of antenna elements that receive a first layer in a first polarization and a second set of antenna elements that receive a second layer in a second polarization, and a second antenna module similarly includes a first set of antenna elements that receive a third layer in the first polarization and a second set of antenna elements that receive a fourth layer in the second polarization. In this case, the first beam pair associated with the best TCI state may point toward one antenna module and the second beam pair associated with the second best TCI state may point toward the other antenna module (e.g., by selecting a dominant cluster and a sub-dominant cluster, where the dominant cluster is typically more dominant than the sub-dominant cluster by a few decibels).

Accordingly, in cases where the network node and the UE communicate using 4L MIMO, the gain that may be achieved by the second set of two layers in the inter-module configuration may be relatively weak compared to the gain that may be achieved by the second set of two layers in the intra-module configuration (e.g., the intra-module configuration may offer a better gain improvement over 2L MIMO). In other words, the intra-module configuration may equalize the four layers in terms of beamforming gains because the UE and the network node select the best cluster and then steer energy toward the best cluster with two different spatial directions, whereas two independent clusters are selected in the inter-module configuration. However, when using the intra-module configuration with four layers, the UE may consume a significant amount of power and generate significant thermal overhead because four layers are used over a single antenna module. On the other hand, in the inter-module configuration, power is somewhat dissipated across the two antenna modules, which results in a lower thermal profile. Accordingly, there may be various tradeoffs between the inter-module and intra-module configurations.

As indicated above, FIG. 5 is provided as an example. Other examples may differ from what is described with regard to FIG. 5.

Figure 6A:
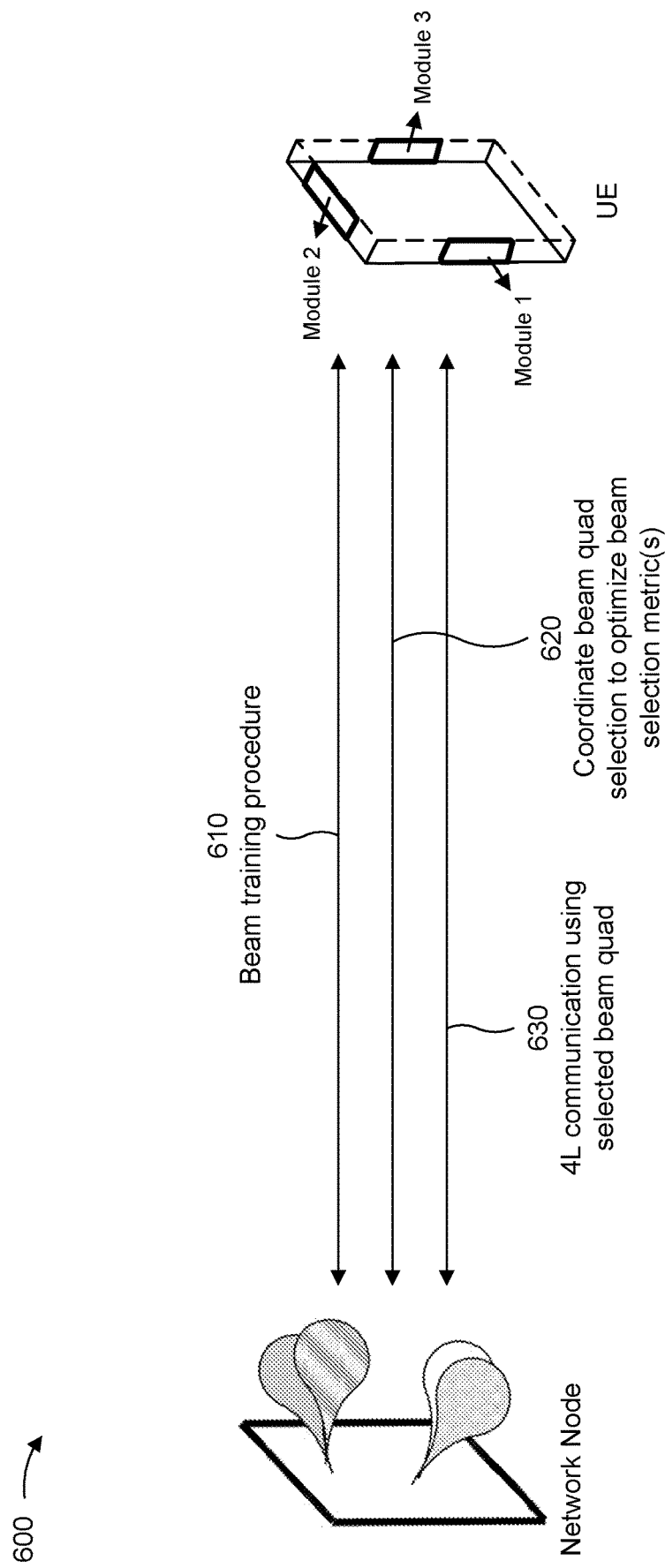
FIGS. 6A-6C are diagrams illustrating examples associated with beam quad selection for 4L millimeter wave transmissions, in accordance with the present disclosure.
Figure 6B:
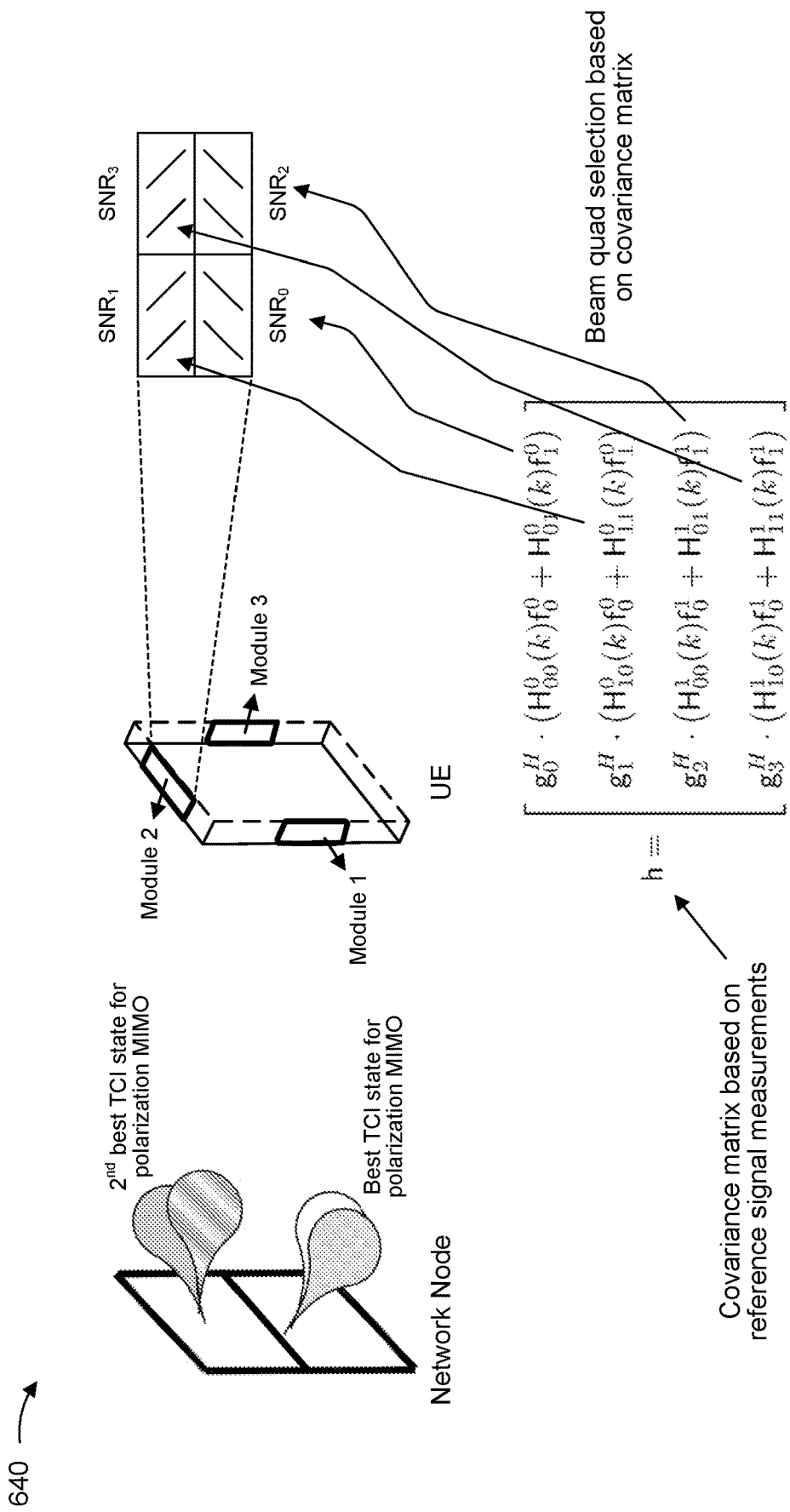
Figure 6C:
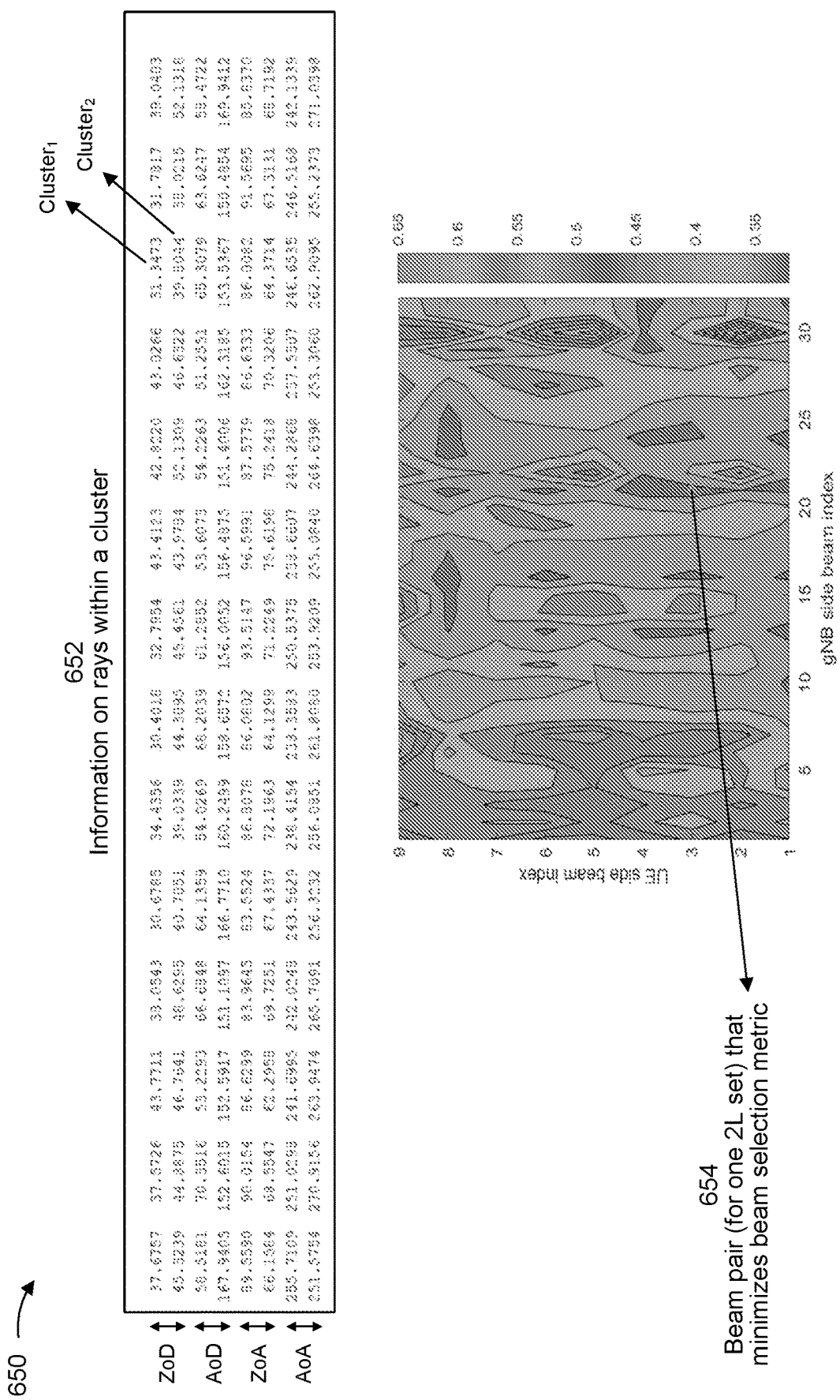

FIGS. 6A-6C are diagrams illustrating examples 600 associated with beam quad selection in millimeter wave transmissions, in accordance with the present disclosure. As shown in FIG. 6A, examples 600 include communication between a network node (e.g., network node 110) and a UE (e.g., UE 120). In some aspects, the network node and the UE may communicate in a wireless network, such as wireless network 100. The network node and the UE may communicate via a wireless access link, which may include an uplink and a downlink.

As shown in FIG. 6A, the network node and the UE may use one or more techniques to coordinate selection of a beam quad that may be used to enable 4L communication between the network node and the UE. For example, as described herein, a beam quad may generally include two beam pairs, where each beam pair is associated with (e.g., points in or is steered toward) a spatial direction and two different polarizations. For example, a beam quad may include a first beam pair that includes a first beam associated with a first spatial direction and a first polarization (e.g., a horizontal or slant 45 polarization) and a second beam associated with the first spatial direction and a second polarization (e.g., a vertical or slant −45 polarization), and the beam quad may further include a second beam pair that includes a first beam associated with a second spatial direction and the first polarization and a second beam associated with the second spatial direction and the second polarization.

In some aspects, as shown by reference number 610, the network node and the UE may initially perform a beam training procedure in which the network node transmits one or more downlink reference signals (e.g., SSBs or CSI-RSs) to the UE, and the UE obtains measurements associated with the one or more downlink reference signals. Accordingly, as shown by reference number 620, the network node and the UE may then coordinate selection of a beam quad that corresponds to two beam pairs, each associated with a spatial direction and two orthogonal polarizations, where the beam quad may be selected to optimize one or more beam selection metrics (e.g., based on the measurements associated with the one or more downlink reference signals). For example, in a first technique, the network node and the UE may perform a beam training procedure using one or more SSB transmissions, and the network node and the UE may coordinate selection of the best and second best TCI states to be used for 4L transmissions using polarization MIMO (e.g., two polarizations per TCI state). Alternatively, in a second technique, the network node and the UE may sweep through different beam quad combinations or permutations during the beam training procedure, and may then coordinate selection of a beam quad to be used to enable 4L communication based on 4L spectral efficiency metrics associated with the different beam quads. Alternatively, in a third technique, the network node and the UE may perform a beam training procedure based on SSB or CSI-RS transmissions using different beam quad combinations or permutations, and the UE may estimate a covariance matrix for each of the 4×4 digital links (or port-to-port connections), which may be used to select a beam quad to optimize a beam selection metric (e.g., a beam quad that minimizes a spread or maximally equalizes eigenvalues of the covariance matrix, as described in further detail herein). In any case, as shown by reference number 630, the network node and the UE may then communicate using the selected beam quad, where the communication may include the UE receiving one or more 4L downlink transmissions from the network node and/or using the beams included in the selected beam quad to transmit information to the network node that indicates the TCI states that the network node is to use for the one or more 4L downlink transmissions.

In some aspects, as described above, the network node and the UE may select a beam quad to use to enable 4L communication using a first technique based on a beam training procedure in which one or more SSB transmissions are used to coordinate selection of the best and second best TCI states to be used for 4L transmissions using polarization MIMO (e.g., two polarizations per TCI state). For example, in some aspects, the beam training procedure may include P1, P2, and/or P3-based beam management procedures, which are described in further detail above with reference to FIG. 4. For example, as described herein, the P1, P2, and P3 beam management procedures are generally based on a first set of candidate beams at the network node and a second set of candidate beams at the UE, where the network node and the UE sweep through the various candidate beams to obtain metrics that relate to a signal strength of a link between the network node and the UE (e.g., the metrics may include RSRP, RSRQ, signal-to-interference-plus-noise ratio (SINR), carrier-to-interference-plus-noise ratio (CINR), signal-to-noise ratio (SNR), RSSI, and/or other suitable metrics that relate to signal quality or signal strength). Accordingly, in some aspects, the network node and the UE sweep through the various candidate beams over SSB transmissions, which are rank-1 signals, which means that two polarizations are mixed at the network node and the combined polarizations are used to obtain the signal strength for a particular spatial direction. For example, the network node may sweep through various candidate beams in a codebook, over an SSB burst set that may include 16, 32, 64, or another suitable number of candidate beams, according to an SSB periodicity (e.g., every 5 milliseconds, every 20 milliseconds, or at other suitable intervals).

Accordingly, in each SSB burst set, the network node sweeps through all the candidate beams, and the UE uses one receive beam to measure the SSB signal with the same receive beam over every SSB burst. Furthermore, the UE has multiple candidate beams, which the UE sweeps through over multiple SSB transmissions using each antenna module to determine one or more beam quality metrics that relate to signal strength per SSB and per antenna module. At the end of an SSB burst, the UE will have obtained one or more signal strength metrics for various candidate beam pairs (e.g., based on the number of candidate beams at the network node times the number of candidate beams at the UE), which may enable the network node and the UE to coordinate the best beam pair, the second best beam pair, and so on. Accordingly, in the first technique, the UE and the network node may perform the P1, P2, and/or P3 beam management procedures to sweep through the candidate beams at the network node and the UE and coordinate the best TCI state and the second best TCI state (e.g., maximizing a signal strength metric such as RSRP, RSRQ, SINR, CINR, SNR, RSSI, or the like), where the best TCI state and the second best TCI state may both be used for polarization MIMO to enable 4L transmissions (e.g., the best TCI state may be used for the first two layers, and the second best TCI state may be used for the other two layers). In this way, the first technique provides a relatively simple procedure to determine the beam quad to be used for 4L communication, which does not require any additional configuration beyond the P1, P2, and P3 beam management procedures that are already used for 2L communication. However, when the beam quad includes two beam pairs that are selected to optimize for signal strength, the spatial direction used for the first beam pair may potentially pick up energy from the spatial direction used for the second beam pair (e.g., the first technique based on P1, P2, and P3 beam management procedures does not incorporate inter-beam inference between the best and second best TCI states, which can lead to a reduction in spectral efficiency). For example, in cases where a particular spatial direction has a good signal quality or signal strength, a neighboring spatial direction typically also has a good signal quality or signal strength (e.g., because the clusters could have a wider spread angle).

In some aspects, in the second technique, the network node and the UE may sweep through different beam quad combinations or permutations during the beam training procedure, and may then coordinate selection of a beam quad to be used to enable 4L communication based on 4L spectral efficiency metrics associated with the different beam quads. For example, in the second technique, the network node and the UE may sweep through various beam pairs in respective codebooks and the UE may compute a spectral efficiency associated with each beam quad (e.g., the network node and the UE each sweep through different candidate beams over four layers, whereby the beam training is performed for four layers explicitly). The UE may then compute the spectral efficiency per beam quad to estimate the available data rate for 4L transmissions, and the UE and the network node may select the beam quad (or group of four beams) to maximize the available data rate. In this way, the second technique is more specifically tailored toward optimizing a 4L beam selection metric, which is the 4L spectral efficiency or data rate. However, one challenge associated with the second technique is that the beam training procedure may carry a large overhead (e.g., in terms of power, thermal, latency, and/or computation). For example, if there are K beams to sweep over two layers at the network node and N beams to sweep over two layers at the UE, the beam training procedure would need to sweep over $K^2$ beams at the network node and $N^2$ at the UE, which results in a total of $K^2 \times N^2$ candidate beam groups that are useable over 4L transmissions. As a result, in cases where K and/or N is large, the number of beams that need to be swept during the beam training procedure increases in a polynomial fashion, which becomes increasingly challenging to implement due to the increased power/thermal overhead.

Accordingly, in some aspects, the third technique described herein may be designed to combine the advantages of the first and second techniques (e.g., simplicity and optimizing a 4L beam selection metric) while mitigating challenges such as inter-beam interference and/or beam training overhead. For example, in the third technique, the UE and the network node may perform a beam training procedure in which the UE and network node sweep through different candidate beam quads to estimate a covariance matrix that is observed for one or more 4×4 digital links (e.g., post-beamformed cross-links in a 4L transmission corresponding to port-to-port transmissions). In some aspects, the candidate beam quads that are used in the beam training procedure may correspond to a subset of candidate beams included in hybrid beamforming codebooks at the network node and/or the UE, where the subset selection may be based on initial acquisition information (e.g., SSB and/or CSI-RS measurements that are used in initial acquisition). Accordingly, based on the covariance matrix that is estimated over SSBs and/or CSI-RSs with different beam quads, the network node and the UE may coordinate selection of the beam quad that minimizes a spread of the four dominant eigenvalues of the covariance matrix and/or selection of the beam quad that maximally equalizes the eigenvalues of the covariance matrix. In this way, the third technique may allow the network node and the UE to select a beam quad that enables approximate equal gain control for 4L transmissions. Furthermore, because the covariance matrix is a second-order channel statistic that changes very little in low or moderate mobility settings (e.g., from symbol to symbol or subframe to subframe), the cost to learn or otherwise estimate the covariance matrix can be amortized (e.g., spread out) over time.

For example, referring to FIG. 6B, reference number 640 depicts a mathematical formulation of the third technique in an intra-module 4L MIMO configuration, although it will be appreciated that the same or similar techniques can be used for an inter-module 4L MIMO configuration. In the example shown in FIG. 6B, post-beamforming in the intra-module 4L MIMO configuration, the UE may receive a scalar channel over a first set of two antenna elements (e.g., the two antenna elements associated with $SNR_1$), may receive a scalar channel over a second set of two antenna elements (e.g., the two antenna elements associated with $SNR_3$), and so, which may be combined to derive a 4×1 vector, h. For example, based on a channel matrix $H_{ij}^p(k)$ ($N_r \times N_t$) over a $k^{th}$ subcarrier and an $i^{th}$ polarization at the UE side and a $i^{th}$ polarization at the network node, where $f_j^p$ is a beam used over the $j^{th}$ polarization and $p^{th}$ panel at the network node and $g_i$ is a beam used at an $i^{th}$ subarray (e.g., a subarray associated with a particular polarization and partition) at the UE, the 4×1 vector, h, may be expressed as:

$$h = \begin{bmatrix} g_0^H \cdot (H_{00}^0(k)f_0^0 + H_{01}^0(k)f_1^0) \\ g_1^H \cdot (H_{10}^0(k)f_0^0 + H_{11}^0(k)f_1^0) \\ g_2^H \cdot (H_{00}^1(k)f_0^1 + H_{01}^1(k)f_1^1) \\ g_3^H \cdot (H_{10}^1(k)f_0^1 + H_{11}^1(k)f_1^1) \end{bmatrix}.$$

In some aspects, the 4×1 vector provided above and depicted in FIG. 6B may correspond to the 4×1 vector that the UE observes over a set of antenna elements over 4L transmissions or 4L receptions at the UE. Accordingly, the UE may estimate a covariance matrix corresponding to the 4×1 vector, which becomes a 4×4 covariance matrix that is a function of the beams or beam groups used in the beam training procedure, whereby the UE may select the beam quad or group of four beams that optimizes a beam selection metric corresponding to the covariance matrix. For example, the UE may select the beam quad to maximize a spread of energy in the 4×4 covariance matrix to increase the power 4L transmissions in such a way that a complementary gain is achieved over the four layers. For example, the beam selection metric may equalize the spread over the four layers to maximize the total energy, which is then spread the over the four layers to obtain the diversity gain of 4L transmissions. In some aspects, these two properties (e.g., total energy and/or spread of energy) can be quantitatively captured using certain eigen-properties that correspond to the covariance matrix, whereby the UE may identify or otherwise select a group of four beams that optimizes the desired eigen-properties, and provide an indication of which set of two beam directions would work best to maximize the total energy and/or spread the total energy for 4L transmissions.

Accordingly, in some aspects, the UE may obtain the 4×1 vector, h, which may be used to estimate a 4×4 covariance matrix $R=E[hh^H]$ for each beam pair (e.g., averaged over different time symbols or averages over frequency). Essentially, the UE may obtain the 4×1 vector estimate over different time snapshots and/or over different frequency snapshots (e.g., within an SSB periodicity, which is typically 20 milliseconds, and/or within a PSS frequency), and the UE may compute a sample covariance matrix corresponding to different time and/or frequency samples, which gives a covariance matrix estimate. The UE may then determine the eigenvalues that correspond to the covariance matrix, and may estimate a first metric that measures the total energy in the covariance matrix R (e.g., via $\Sigma\lambda_i$, where $\lambda_i$ is the $i^{th}$ eigenvalue) and a second metric that measures a spread of the eigenvalues of the covariance matrix R after normalization (e.g., defined as $\Sigma\lambda_i^2$). In the latter case, for the second metric that measures the spread of the eigenvalues of the normalized covariance matrix R, the UE may select a beam quad to minimize a delta between a largest and a smallest eigenvalue, where each eigenvalue represents the gain associated with the different layers. As such, if the separation or spread between the largest and the smallest eigenvalue is small, the UE may achieve approximately the same gain over the four layers such that 4L MIMO offers good performance in that particular channel realization. Accordingly, the UE may select a beam quad associated with a smallest spread of eigenvalues and/or a largest total energy. Alternatively, in some aspects, the UE may select a beam quad with the first metric normalized such that a trace of the covariance matrix R is one (1) (e.g., $\Sigma\lambda_i=1$) and then minimize the second metric.

For example, referring to FIG. 6C, reference number 650 depicts an example of beam quad selection in a scenario with twenty (20) rays per cluster with departure angles in the azimuth and the zenith and arrival angles in the azimuth and the zenith. For example, reference number 652 depicts information on the first fourteen rays within various clusters, where the numbers in the table indicate the zenith of departure (ZoD), azimuth of departure (AoD), zenith of arrival (ZoA), and azimuth of arrival (AoA) angles in degrees. As shown, the first row corresponds to a first cluster and the second row corresponds to a second cluster, where the ZoD angles for the first cluster and the second cluster are relatively close (e.g., 37.6757° and 45.3239° for a first ray), but there is a relatively large separation between the AoD angles (e.g., 58.5181° and 167.9405° for the first ray). In general, when the angles are comparable in one domain (e.g., in azimuth or elevation), the same beam can be used for 4L transmission and separation may be observed at the receiving end. In this context, reference number 654 depicts an example that minimizes the spread of eigenvalues in a scenario where the network node has 32 candidate beams, and the UE has 9 candidate beams. In this case, there are $32^2=1024$ beam quads at the network node and $9^2=81$ beam quads at the UE, whereby the UE may compute 1024×81 covariance matrices, which are then evaluated to optimize the relevant beam selection metric (e.g., selecting a point in the space that minimizes the spread of eigenvalues in the illustrated example).

As indicated above, FIGS. 6A-6C is provided as an example. Other examples may differ from what is described with regard to FIGS. 6A-6C.

Figure 7:
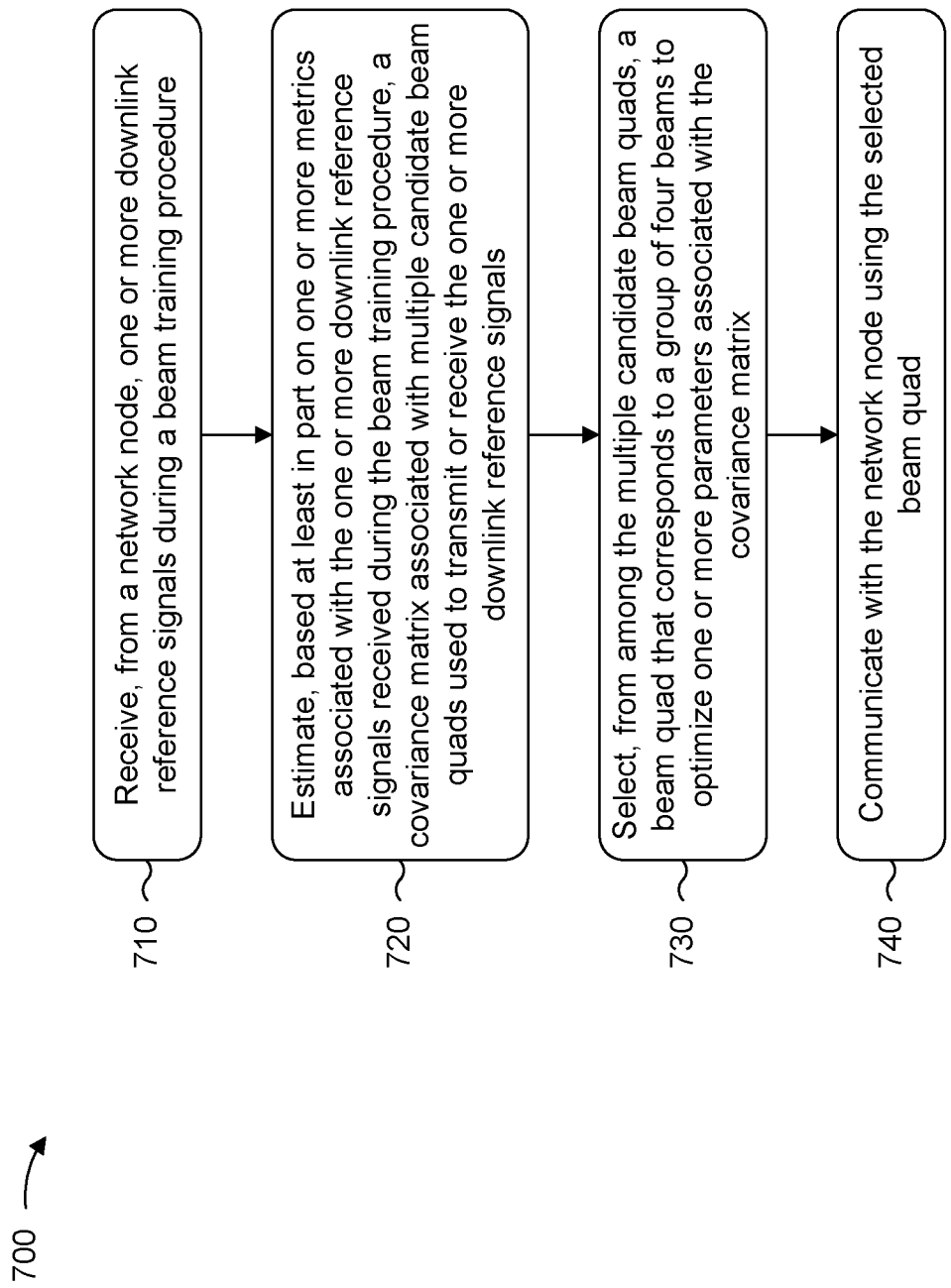
FIG. 7 is a diagram illustrating an example process associated with beam quad selection for 4L millimeter wave transmissions, in accordance with the present disclosure.

FIG. 7 is a diagram illustrating an example process 700 performed, for example, by a UE, in accordance with the present disclosure. Example process 700 is an example where the UE (e.g., UE 120) performs operations associated with beam quad selection for 4L millimeter wave transmissions.

As shown in FIG. 7, in some aspects, process 700 may include receiving, from a network node, one or more downlink reference signals during a beam training procedure (block 710). For example, the UE (e.g., using communication manager 140 and/or reception component 802, depicted in FIG. 8) may receive, from a network node, one or more downlink reference signals during a beam training procedure, as described above.

As further shown in FIG. 7, in some aspects, process 700 may include estimating, based at least in part on one or more metrics associated with the one or more downlink reference signals received during the beam training procedure, a covariance matrix associated with multiple candidate beam quads used to transmit or receive the one or more downlink reference signals (block 720). For example, the UE (e.g., using communication manager 140 and/or beam selection component 808, depicted in FIG. 8) may estimate, based at least in part on one or more metrics associated with the one or more downlink reference signals received during the beam training procedure, a covariance matrix associated with multiple candidate beam quads used to transmit or receive the one or more downlink reference signals, as described above.

As further shown in FIG. 7, in some aspects, process 700 may include selecting, from among the multiple candidate beam quads, a beam quad that corresponds to a group of four beams to optimize one or more parameters associated with the covariance matrix (block 730). For example, the UE (e.g., using communication manager 140 and/or beam selection component 808, depicted in FIG. 8) may select, from among the multiple candidate beam quads, a beam quad that corresponds to a group of four beams to optimize one or more parameters associated with the covariance matrix, as described above.

As further shown in FIG. 7, in some aspects, process 700 may include communicating with the network node using the selected beam quad (block 740). For example, the UE (e.g., using communication manager 140, reception component 802, and/or transmission component 804, depicted in FIG. 8) may communicate with the network node using the selected beam quad, as described above.

Process 700 may include additional aspects, such as any single aspect or any combination of aspects described below and/or in connection with one or more other processes described elsewhere herein.

In a first aspect, the beam quad is selected to maximize a total energy associated with the group of four beams.

In a second aspect, alone or in combination with the first aspect, the beam quad is selected to minimize a spread of eigenvalues associated with the estimated covariance matrix.

In a third aspect, alone or in combination with one or more of the first and second aspects, the beam quad is selected to maximally equalize eigenvalues associated with the estimated covariance matrix.

In a fourth aspect, alone or in combination with one or more of the first through third aspects, the multiple candidate beam quads used to transmit or receive the one or more downlink reference signals include a subset of beam quads from hybrid beamforming codebooks at the UE and the network node.

In a fifth aspect, alone or in combination with one or more of the first through fourth aspects, selecting the beam quad includes estimating, based at least in part on the one or more metrics associated with the one or more downlink reference signals received during the beam training procedure, a 4L spectral efficiency associated with multiple candidate beam quads used to transmit or receive the one or more downlink reference signals, and selecting, from among the multiple candidate beam quads, the beam quad to maximize a value of the 4L spectral efficiency.

In a sixth aspect, alone or in combination with one or more of the first through fifth aspects, selecting the beam quad includes selecting, based at least in part on the one or more metrics associated with the one or more downlink reference signals received during the beam training procedure, a first beam pair associated with a first TCI state associated with a best metric, and selecting, based at least in part on the one or more metrics associated with the one or more downlink reference signals received during the beam training procedure, a second beam pair associated with a second TCI state associated with a next best metric, wherein the beam quad includes the first beam pair and the second beam pair, and wherein the first TCI state is the same as or different from the second TCI state.

In a seventh aspect, alone or in combination with one or more of the first through sixth aspects, the beam quad includes a first beam associated with a first spatial direction and a first polarization, a second beam associated with the first spatial direction and a second polarization, a third beam associated with a second spatial direction and the first polarization, and a fourth beam associated with the second spatial direction and the second polarization.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
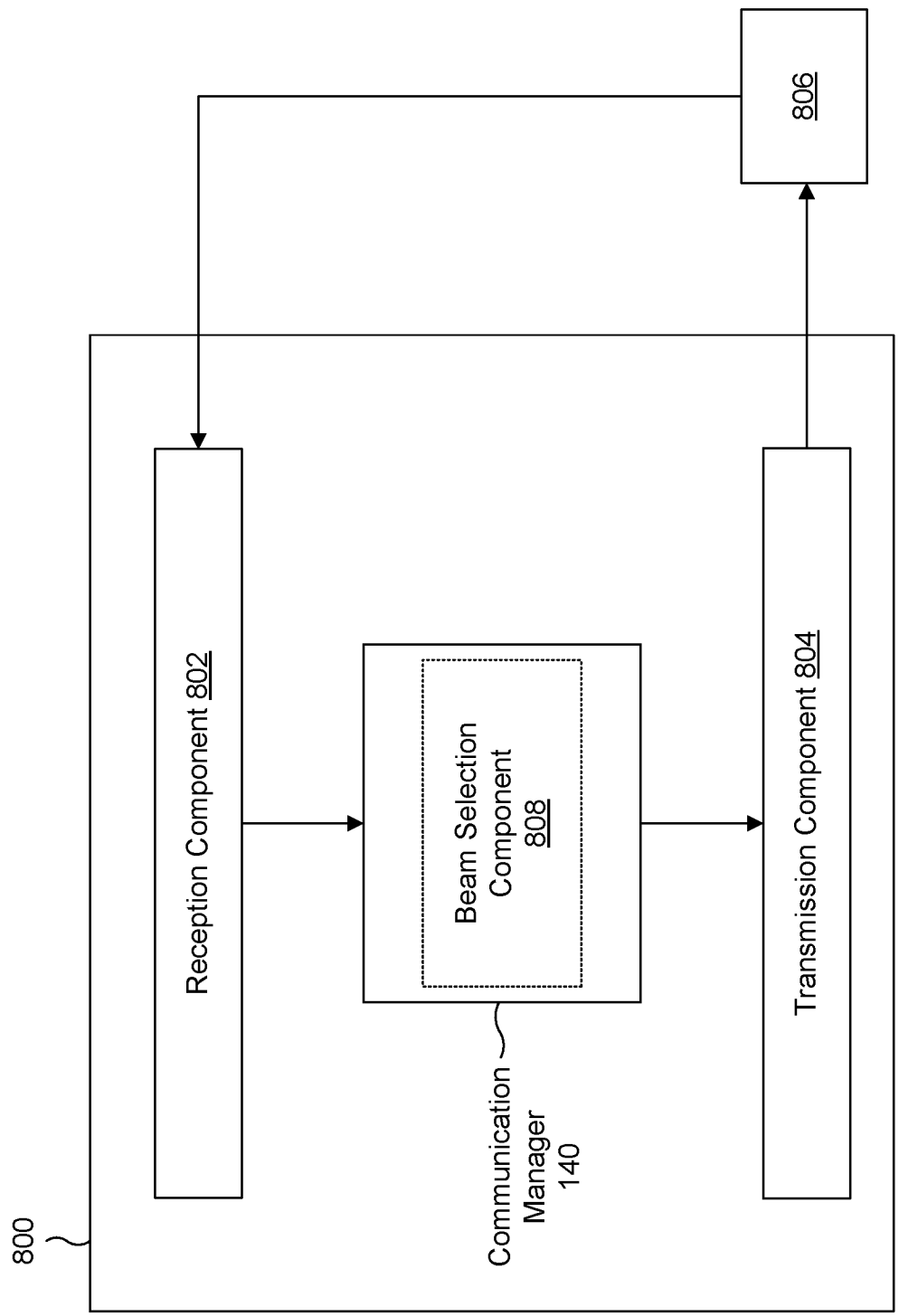
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include a beam selection component 808, among other examples.

In some aspects, the apparatus 800 may be configured to perform one or more operations described herein in connection with FIG. 5 and/or FIGS. 6A-6C. Additionally, or alternatively, the apparatus 800 may be configured to perform one or more processes described herein, such as process 700 of FIG. 7. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The reception component 802 may receive, from a network node, one or more downlink reference signals during a beam training procedure. The beam selection component 808 may estimate, based at least in part on one or more metrics associated with the one or more downlink reference signals received during the beam training procedure, a covariance matrix associated with multiple candidate beam quads used to transmit or receive the one or more downlink reference signals. The beam selection component 808 may select, from among the multiple candidate beam quads, a beam quad that corresponds to a group of four beams to optimize one or more parameters associated with the covariance matrix. The reception component 802 and/or the transmission component 804 may communicate with the network node using the selected beam quad.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a UE, comprising: receiving, from a network node, one or more downlink reference signals during a beam training procedure; estimating, based at least in part on one or more metrics associated with the one or more downlink reference signals received during the beam training procedure, a covariance matrix associated with multiple candidate beam quads used to transmit or receive the one or more downlink reference signals; selecting, from among the multiple candidate beam quads, a beam quad that corresponds to a group of four beams to optimize one or more parameters associated with the covariance matrix; and communicating with the network node using the selected beam quad.

Aspect 2: The method of Aspect 1, wherein the beam quad is selected to maximize a total energy associated with the group of four beams.

Aspect 3: The method of any of Aspects 1-2, wherein the beam quad is selected to minimize a spread of eigenvalues associated with the estimated covariance matrix.

Aspect 4: The method of any of Aspects 1-3, wherein the beam quad is selected to maximally equalize eigenvalues associated with the estimated covariance matrix.

Aspect 5: The method of any of Aspects 1-4, wherein the multiple candidate beam quads used to transmit or receive the one or more downlink reference signals include a subset of beam quads from hybrid beamforming codebooks at the UE and the network node.

Aspect 6: The method of any of Aspects 1-5, wherein selecting the beam quad includes: estimating, based at least in part on the one or more metrics associated with the one or more downlink reference signals received during the beam training procedure, a 4L spectral efficiency associated with multiple candidate beam quads used to transmit or receive the one or more downlink reference signals; and selecting, from among the multiple candidate beam quads, the beam quad to maximize a value of the 4L spectral efficiency.

Aspect 7: The method of any of Aspects 1-5, wherein selecting the beam quad includes: selecting, based at least in part on the one or more metrics associated with the one or more downlink reference signals received during the beam training procedure, a first beam pair associated with a first TCI state associated with a best metric; and selecting, based at least in part on the one or more metrics associated with the one or more downlink reference signals received during the beam training procedure, a second beam pair associated with a second TCI state associated with a next best metric, wherein the beam quad includes the first beam pair and the second beam pair, and wherein the first TCI state is the same as or different from the second TCI state.

Aspect 8: The method of any of Aspects 1-7, wherein the beam quad includes a first beam associated with a first spatial direction and a first polarization, a second beam associated with the first spatial direction and a second polarization, a third beam associated with a second spatial direction and the first polarization, and a fourth beam associated with the second spatial direction and the second polarization.

Aspect 9: An apparatus for wireless communication at a device, comprising a processor; memory coupled with the processor; and instructions stored in the memory and executable by the processor to cause the apparatus to perform the method of one or more of Aspects 1-8.

Aspect 10: A device for wireless communication, comprising a memory and one or more processors coupled to the memory, the one or more processors configured to perform the method of one or more of Aspects 1-8.

Aspect 11: An apparatus for wireless communication, comprising at least one means for performing the method of one or more of Aspects 1-8.

Aspect 12: A non-transitory computer-readable medium storing code for wireless communication, the code comprising instructions executable by a processor to perform the method of one or more of Aspects 1-8.

Aspect 13: A non-transitory computer-readable medium storing a set of instructions for wireless communication, the set of instructions comprising one or more instructions that, when executed by one or more processors of a device, cause the device to perform the method of one or more of Aspects 1-8.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving, from a network node, one or more downlink reference signals during a beam training procedure;
   estimating, based at least in part on one or more metrics associated with the one or more downlink reference signals received during the beam training procedure, a covariance matrix associated with multiple candidate beam quads used to transmit or receive the one or more downlink reference signals,
   wherein each candidate beam quad, of the multiple candidate beam quads, comprises four beams;
   selecting, from among the multiple candidate beam quads, a beam quad that corresponds to a group of four beams to optimize one or more parameters associated with the covariance matrix; and
   communicating with the network node using the selected beam quad.

2. The method of claim 1, wherein the beam quad is selected to maximize a total energy associated with the group of four beams.

3. The method of claim 1, wherein the beam quad is selected to minimize a spread of eigenvalues associated with the estimated covariance matrix.

4. The method of claim 1, wherein the beam quad is selected to maximally equalize eigenvalues associated with the estimated covariance matrix.

5. The method of claim 1, wherein the multiple candidate beam quads used to transmit or receive the one or more downlink reference signals include a subset of beam quads from hybrid beamforming codebooks at the UE and the network node.

6. The method of claim 1, wherein selecting the beam quad includes:
   estimating, based at least in part on the one or more metrics associated with the one or more downlink reference signals received during the beam training procedure, a four-layer spectral efficiency associated with the multiple candidate beam quads used to transmit or receive the one or more downlink reference signals; and
   selecting, from among the multiple candidate beam quads, the beam quad to maximize a value of the four-layer spectral efficiency.

7. The method of claim 1, wherein selecting the beam quad includes:
   selecting, based at least in part on the one or more metrics associated with the one or more downlink reference signals received during the beam training procedure, a first beam pair associated with a first transmission configuration indication (TCI) state associated with a best metric; and
   selecting, based at least in part on the one or more metrics associated with the one or more downlink reference signals received during the beam training procedure, a second beam pair associated with a second TCI state associated with a next best metric, wherein the beam quad includes the first beam pair and the second beam pair, and wherein the first TCI state is the same as or different from the second TCI state.

8. The method of claim 1, wherein the beam quad includes a first beam associated with a first spatial direction and a first polarization, a second beam associated with the first spatial direction and a second polarization, a third beam associated with a second spatial direction and the first polarization, and a fourth beam associated with the second spatial direction and the second polarization.

9. An apparatus for wireless communication, comprising:
   one or more memories; and
   one or more processors, based at least in part on information stored in the one or more memories, configured to:
   receive, from a network node, one or more downlink reference signals during a beam training procedure;
   estimate, based at least in part on one or more metrics associated with the one or more downlink reference signals received during the beam training procedure, a covariance matrix associated with multiple candidate beam quads used to transmit or receive the one or more downlink reference signals,
   wherein each candidate beam quad, of the multiple candidate beam quads, comprises four beams;
   select, from among the multiple candidate beam quads, a beam quad that corresponds to a group of four beams to optimize one or more parameters associated with the covariance matrix; and
   communicate with the network node using the selected beam quad.

10. The apparatus of claim 9, wherein the beam quad is selected to maximize a total energy associated with the group of four beams.

11. The apparatus of claim 9, wherein the beam quad is selected to minimize a spread of eigenvalues associated with the estimated covariance matrix.

12. The apparatus of claim 9, wherein the beam quad is selected to maximally equalize eigenvalues associated with the estimated covariance matrix.

13. The apparatus of claim 9, wherein the multiple candidate beam quads used to transmit or receive the one or more downlink reference signals include a subset of beam quads from hybrid beamforming codebooks at the apparatus and the network node.

14. The apparatus of claim 9, wherein the one or more processors, to select the beam quad, are configured to:
estimate, based at least in part on the one or more metrics associated with the one or more downlink reference signals received during the beam training procedure, a four-layer spectral efficiency associated with the multiple candidate beam quads used to transmit or receive the one or more downlink reference signals; and
select, from among the multiple candidate beam quads, the beam quad to maximize a value of the four-layer spectral efficiency.

15. The apparatus of claim 9, wherein the one or more processors, to select the beam quad, are configured to:
select, based at least in part on the one or more metrics associated with the one or more downlink reference signals received during the beam training procedure, a first beam pair associated with a first transmission configuration indication (TCI) state associated with a best metric; and
select, based at least in part on the one or more metrics associated with the one or more downlink reference signals received during the beam training procedure, a second beam pair associated with a second TCI state associated with a next best metric, wherein the beam quad includes the first beam pair and the second beam pair, and wherein the first TCI state is the same as or different from the second TCI state.

16. The apparatus of claim 9, wherein the beam quad includes a first beam associated with a first spatial direction and a first polarization, a second beam associated with the first spatial direction and a second polarization, a third beam associated with a second spatial direction and the first polarization, and a fourth beam associated with the second spatial direction and the second polarization.

17. A non-transitory computer-readable medium storing a set of instructions for wireless communication, the set of instructions comprising:
one or more instructions that, when executed by one or more processors of a user equipment (UE), cause the UE to:
receive, from a network node, one or more downlink reference signals during a beam training procedure;
estimate, based at least in part on one or more metrics associated with the one or more downlink reference signals received during the beam training procedure, a covariance matrix associated with multiple candidate beam quads used to transmit or receive the one or more downlink reference signals,
wherein each candidate beam quad, of the multiple candidate beam quads, comprises four beams;
select, from among the multiple candidate beam quads, a beam quad that corresponds to a group of four beams to optimize one or more parameters associated with the covariance matrix; and
communicate with the network node using the selected beam quad.

18. The non-transitory computer-readable medium of claim 17, wherein the beam quad is selected to maximize a total energy associated with the group of four beams.

19. The non-transitory computer-readable medium of claim 17, wherein the beam quad is selected to minimize a spread of eigenvalues associated with the estimated covariance matrix.

20. The non-transitory computer-readable medium of claim 17, wherein the beam quad is selected to maximally equalize eigenvalues associated with the estimated covariance matrix.

21. The non-transitory computer-readable medium of claim 17, wherein the multiple candidate beam quads used to transmit or receive the one or more downlink reference signals include a subset of beam quads from hybrid beamforming codebooks at the UE and the network node.

22. The non-transitory computer-readable medium of claim 17, wherein the one or more instructions, that cause the UE to select the beam quad, cause the UE to:
estimate, based at least in part on the one or more metrics associated with the one or more downlink reference signals received during the beam training procedure, a four-layer spectral efficiency associated with the multiple candidate beam quads used to transmit or receive the one or more downlink reference signals; and
select, from among the multiple candidate beam quads, the beam quad to maximize a value of the four-layer spectral efficiency.

23. The non-transitory computer-readable medium of claim 17, wherein the one or more instructions, that cause the UE to select the beam quad, cause the UE to:
select, based at least in part on the one or more metrics associated with the one or more downlink reference signals received during the beam training procedure, a first beam pair associated with a first transmission configuration indication (TCI) state associated with a best metric; and
select, based at least in part on the one or more metrics associated with the one or more downlink reference signals received during the beam training procedure, a second beam pair associated with a second TCI state associated with a next best metric, wherein the beam quad includes the first beam pair and the second beam pair, and wherein the first TCI state is the same as or different from the second TCI state.

24. An apparatus for wireless communication, comprising:
means for receiving, from a network node, one or more downlink reference signals during a beam training procedure;
means for estimating, based at least in part on one or more metrics associated with the one or more downlink reference signals received during the beam training procedure, a covariance matrix associated with multiple candidate beam quads used to transmit or receive the one or more downlink reference signals,
wherein each candidate beam quad, of the multiple candidate beam quads, comprises four beams;
means for selecting, from among the multiple candidate beam quads, a beam quad that corresponds to a group of four beams to optimize one or more parameters associated with the covariance matrix; and
means for communicating with the network node using the selected beam quad.

25. The apparatus of claim 24, wherein the beam quad is selected to maximize a total energy associated with the group of four beams.

26. The apparatus of claim 24, wherein the beam quad is selected to minimize a spread of eigenvalues associated with the estimated covariance matrix.

27. The apparatus of claim 24, wherein the beam quad is selected to maximally equalize eigenvalues associated with the estimated covariance matrix.

28. The apparatus of claim 24, wherein the multiple candidate beam quads used to transmit or receive the one or more downlink reference signals include a subset of beam quads from hybrid beamforming codebooks at the apparatus and the network node.

29. The apparatus of claim 24, wherein the means for selecting the beam quad includes:
   means for estimating, based at least in part on the one or more metrics associated with the one or more downlink reference signals received during the beam training procedure, a four-layer spectral efficiency associated with the multiple candidate beam quads used to transmit or receive the one or more downlink reference signals; and
   means for selecting, from among the multiple candidate beam quads, the beam quad to maximize a value of the four-layer spectral efficiency.

30. The apparatus of claim 24, wherein the means for selecting the beam quad includes:
   means for selecting, based at least in part on the one or more metrics associated with the one or more downlink reference signals received during the beam training procedure, a first beam pair associated with a first transmission configuration indication (TCI) state associated with a best metric; and
   means for selecting, based at least in part on the one or more metrics associated with the one or more downlink reference signals received during the beam training procedure, a second beam pair associated with a second TCI state associated with a next best metric, wherein the beam quad includes the first beam pair and the second beam pair, and wherein the first TCI state is the same as or different from the second TCI state.

* * * * *